Figure 1:
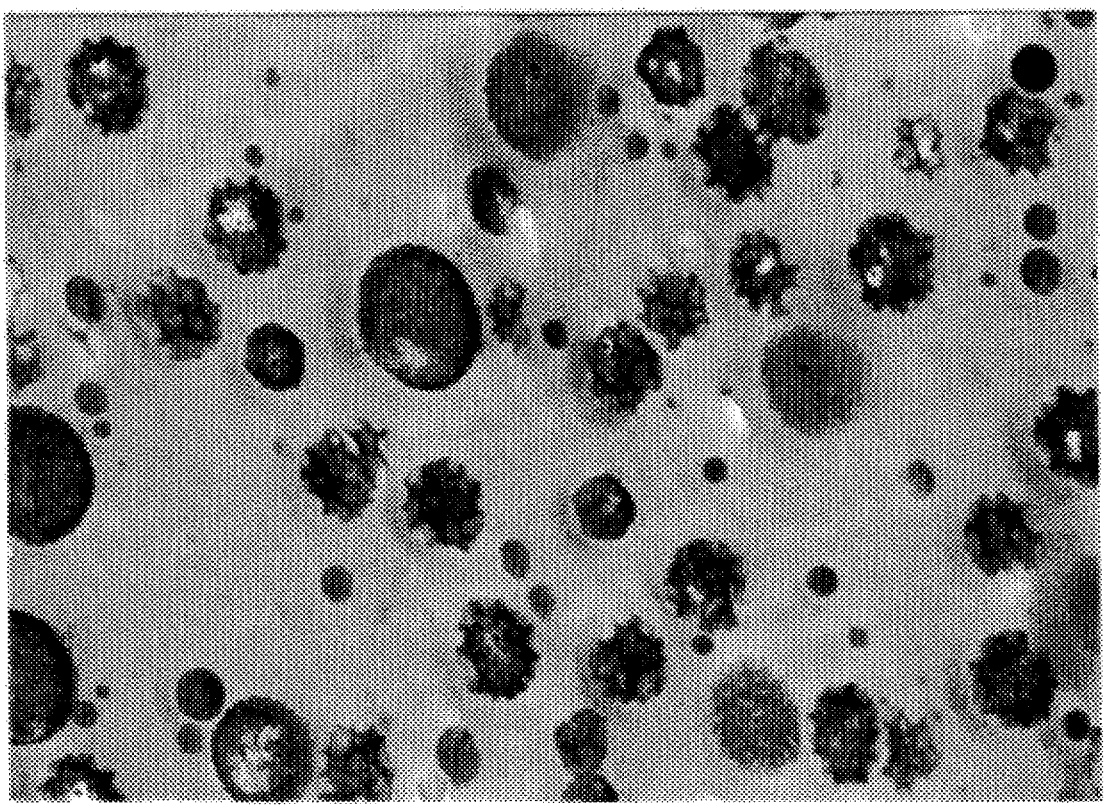

United States Patent [19]

Eichenauer et al.

[11] Patent Number: 5,708,079
[45] Date of Patent: Jan. 13, 1998

[54] THERMOPLASTIC ABS MOULDING COMPOSITIONS

[75] Inventors: Herbert Eichenauer; Edgar Leitz, both of Dormagen; Karl-Erwin Piejko, Bergisch Gladbach; Peter Krüger, Leverkusen, all of Germany

[73] Assignee: Bayer AG, Leverkusen, Germany

[21] Appl. No.: 642,913

[22] Filed: May 6, 1996

[30] Foreign Application Priority Data

May 17, 1995 [DE] Germany .................. 195 18 025.9

[51] Int. Cl.$^6$ ..................... C08L 51/04; C08L 55/02
[52] U.S. Cl. .................................. 525/71; 525/316
[58] Field of Search ........................ 525/71, 316

[56] References Cited

U.S. PATENT DOCUMENTS

| | | | |
|---|---|---|---|
| 5,270,387 | 12/1993 | Sheilds et al. | 525/71 |
| 5,352,728 | 10/1994 | Kim et al. | 524/501 |
| 5,430,100 | 7/1995 | Dotson et al. | 525/71 |
| 5,434,218 | 7/1995 | Baumgartner et al. | 525/71 |

FOREIGN PATENT DOCUMENTS

| | | |
|---|---|---|
| 0 319 848 | 6/1989 | European Pat. Off. . |
| 0 485 793 | 5/1992 | European Pat. Off. . |
| 0717077 | 6/1996 | European Pat. Off. . |

Primary Examiner—Irina S. Zemel
Attorney, Agent, or Firm—Connolly and Hutz

[57] ABSTRACT

Thermoplastic moulding compositions containing

A) 5 to 95 parts by wt of at least one particle-shaped graft rubber polymer of the ABS type manufactured by emulsion polymerization, in which the graft rubber particles have such a structure detectable by transmission electron microscope photographs, in which the individual particles contain irregular cell-shaped inclusions of resin-forming polymer and the surface of the particles shows such an irregular toothed structure, that for every particle imaged 5 to 30 of such teeth are present, which are distinguished from an idealized round particle (with a diameter d) by a diameter $d+d/x$ with $x=3$ to 15, B) 95 to 5 parts by wt of at least one particle-shaped graft rubber polymer of the ABS type manufactured by emulsion polymerization, in which the graft rubber particles have such a structure detectable by transmission electron microscope photographs, in which the individual particles do not have a pronounced inner structure as in A) and possess a round particle shape with completely tooth-free surface and optionally C) 0 to 300 parts by wt of at least one thermoplastic rubber-free resin.

6 Claims, 1 Drawing Sheet

40000:1

THERMOPLASTIC ABS MOULDING COMPOSITIONS

ABS moulding compositions have already been used for many years in large amounts as thermoplastic resins for the manufacture of mouldings of all kinds. The property range of these resins extends from relatively brittle to highly resistant.

A particular field of use for ABS moulding compositions is the manufacture of mouldings with high requirements as to the resistance under impact, in particular also at low temperatures, as well as the possibility of the deliberate setting of the surface hardness or of the modulus of elasticity (e.g. manufacture of parts with high rigidity and good scratch resistance in the automobile sector or in the manufacture of casing parts) with simultaneously very good thermoplastic processability and retention of the other ABS-typical properties (e.g. good surface gloss, good heat resistance).

One possible way of obtaining these properties is the use of ABS polymers in which the rubber phase has a special toothed structure (see German patent application P 4 441 846.9). If these polymers are used for the manufacture of coloured mouldings with fin structures, however, a deepening in colour can occur behind the fins, whereby the visual impression of an irregular colouring is given.

The problem therefore arose of producing moulding compositions which do not lead to a deepening in colour and at the same time retain the above-mentioned good properties to a large extent.

It was found that, through a special combination of ABS polymers with special structures manufactured by emulsion polymerisation, products with the property combinations described above can be formulated without a troublesome deepening in colour behind fins occurring.

The invention provides thermoplastic moulding compositions containing:

A) 5 to 95 parts by wt, preferably 10 to 80 parts by wt and particularly preferably 15 to 70 parts by wt of at least one particle-shaped graft rubber polymer of the ABS type manufactured by emulsion polymerisation, in which the graft rubber particles have such a structure detectable by transmission electron microscope photographs, in which the individual particles contain irregular cell-shaped inclusions of resin-forming polymer and the surface of the particles shows such an irregular toothed structure, that for every particle imaged 5 to 30, preferably 7 to 25 and particularly preferably 10 to 20 of such teeth are present, which are distinguished from an idealised round particle (with a diameter d) by a diameter d+d/x with x=3 to 15, preferably 4 to 12 and particularly preferably 5 to 10.

B) 95 to 5 parts by wt, preferably 90 to 20 parts by wt and particularly preferably 85 to 30 parts by wt of at least one particle-shaped graft rubber polymer of the ABS type manufactured by emulsion polymerisation, in which the graft rubber particles have such a structure detectable by transmission electron microscope photographs, in which the individual particles do not have a pronounced inner structure as in A) and possess a round particle shape with completely tooth-free surface and optionally C) 0 to 300 parts by wt, preferably 20 to 250 parts by wt and particularly preferably 50 to 200 parts by wt of at least one thermoplastic rubber-free resin.

The manufacture of the graft rubber polymer A) takes place by the emulsion polymerisation of resin-forming monomers in the presence of the rubber present in latex form.

To this end preferably 40 to 90 parts by wt, particularly preferably 45 to 85 parts by wt and quite particularly preferably 50 to 80 parts by wt of a resin-forming monomer (preferably a mixture of styrene and acrylonitrile which optionally can contain up to 50 wt % (referred to the total amount of the monomers used in the graft polymerisation) of one or more comonomers) is polymerised in the presence of 10 to 60 parts by wt, preferably 15 to 55 parts by wt and particularly preferably to 50 parts by wt (calculated as solid in each case) of a rubber latex (preferably polybutadiene latex) with a swelling index $\geq 30$, preferably $\geq 40$ and particularly preferably $\geq 50$ (in toluene) in such a way that during 25 to 90%, preferably 30 to 80% and particularly preferably 35 to 75%. of the total reaction time in the reaction mixture an amount of 5 to 70 wt %, preferably 7.5 to 60 wt % and particularly preferably 10 to 50 wt % (referred to total monomer used up to the particular point in time) of unreacted monomer is present.

There are preferably used as rubbers for manufacturing graft rubber polymer A those with a glass transition temperature of less than 0° C.

Suitable rubbers include:

diene rubbers, that is homopolymers of conjugated dienes with 4 to 8 C-atoms such as butadiene, isoprene, chloroprene or their copolymers with up to 60 wt %, preferably 1 to 30 wt %, of a vinyl monomer, e.g. acrylonitrile, methacrylonitrile, styrene, α-methylstyrene, halogen styrenes, $C_1$–$C_4$ alkyl styrenes, $C_1$–$C_6$-alkyl acrylates and methacrylates, alkylene-glycol diacrylates and methacrylates as well as divinyl benzene;

acrylate rubbers, that is homo- and copolymers of $C_1$–$C_{10}$ alkyl acrylates, e.g. homopolymers of ethyl acrylate, butyl acrylate, 2-ethylhexyl acrylate or copolymers with up to 40 wt %, preferably not more than 10 wt % of mono-vinylmonomers, e.g. styrene, acrylonitrile, vinylbutyl ether, acrylic acid (ester), methacrylic acid (ester), vinylsulphonic acid. There are preferably used acrylate rubber homo- or copolymers that contain 0.01 to 8 wt % of divinyl or polyvinyl compounds and/or N-methylol acrylamide (or -methacrylamide) derivatives, which act as cross-linkers, e.g. divinyl benzene, triallyl cyanurate and wherein the rubber contains C=C double bonds;

terpolymer rubbers, that is copolymers of mono-olefinic hydrocarbons, e.g. ethylene, propylene and dienes, e.g. butadiene, cyclopentadiene.

Preferred are polybutadiene rubbers and SBR rubbers with up to 30 wt % of internally polymerised styrene, particularly preferred is polybutadiene.

The rubber polymers to be used for manufacturing the graft rubber polymer A) have swelling indices (in toluene) $\geq 30$, preferably $\geq 40$ and particularly preferably $\geq 50$. The determination of the swelling index takes place as follows:

1 g of dry stabilized finely-chopped rubber is mixed with 100 cm³ of toluene and shaken in a brown flask for 24 h. It is then extracted through a double cloth filter until the filtrate no longer shows a deposit. After washing with further toluene the deposit is weighed in the moist state. It is then dried in the drying cabinet at 70 ° C. up to constant weight and weighed again. The swelling index (SI) is obtained from the ratio $$QI = \frac{\text{deposit (moist)}}{\text{deposit (dry)}}.$$

The manufacture of rubbers with such swelling indices is known in principle, the required values being set by the application of suitable reaction conditions (e.g. low reaction temperature or addition of molecular weight regulators, e.g. mercaptans).

The size of the rubber particles to be used for manufacturing the graft rubber polymer A) can be varied within wide limits, e.g. in principle mean particle diameters of approx. 50 nm to approx. 500 nm are possible; preferred are rubber particles with mean diameters of approx. 200 nm to approx. 400 nm, particularly preferred of approx. 250 nm to approx. 350 nm. Mean particle diameters mean here $d_{50}$ values which have been determined by ultra-centrifugal measurement (cf. W. Scholtan and H. Lange in Kolloid-Z. und Z. Polymere 250, pp. 782–796 (1972).

Resin-forming monomers used for the manufacture of graft rubber are preferably compounds with a vinyl group, e.g. styrene, $C_1$–$C_4$-alkyl-substituted styrenes, α-methylstyrene, acrylonitrile, methacrylonitrile, esters of acrylic acid and/or of methacrylic acid with $C_1$–$C_8$-aliphatic or cycloaliphatic alcohols, N-substituted maleiimide or mixtures thereof. Particularly preferred are mixtures of styrene and acrylonitrile, preferably in the weight ratio 60:40 to 80:20, wherein styrene and/or acrylonitrile can be replaced in some cases by copolymerisable monomers, preferably by α-methylstyrene, methylmethacrylate or N-phenyl maleiimide.

In addition use can be made for the graft polymerisation of molecular weight regulators, preferably in mounts of 0.05 to 2 wt %, particularly preferably in mounts of 0.1 to 1 wt % (referred in each case to total quantity of monomer in the graft polymerisation reaction).

Suitable molecular weight regulators are for example n-dodecyl mercaptan, t-dodecyl mercaptan, dimeric α-methyl-styrene.

There are considered as initiators practically all substances functioning as radical formers. Examples of the latter are inorganic and organic peroxides, e.g. $H_2O_2$, di-tert.-butyl peroxide, cumene hydroperoxide, dicyclohexyl percarbonate, tert.-butylhydroperoxide, p-menthane hydroperoxide, azo initiators such as e.g. azobis isobutyronitrile, inorganic per salts such as ammonium, sodium or potassium persulphate, potassium persulphate, sodium perborate as well as redox systems which are composed of an as a rule organic oxidizing agent and a reducing agent, wherein preferably heavy metal ions are additionally present in the reaction medium (see H. Logemann in Houben-Weyl, Methoden der Organischen Chemie, Vol. 14/1, pp. 263 to 297).

Preferred initiators are ammonium, sodium and potassium persulphate, particularly preferred is potassium persulphate.

The reaction temperature for the manufacture of graft rubber is 30° to 150° C., preferably 40° to 90° C.

There can be used as emulsifiers the conventional anionic emulsifiers such as alkyl sulphates, alkyl sulphonates, aralkyl sulphonates, soaps of alkaline disproportionated or hydrated abietic or tall oil acids, soaps of saturated or unsaturated fatty acids, emulsifiers based on compounds with cyclic hydrocarbon structures according to DE-OS 3 919 548 and DE-OS 3 925 634, preferably used are emulsifiers with carboxyl groups (e.g. salts of $C_{10}$–$C_{18}$-fatty acids, salts of disproportionated abietic acid).

The structure of the graft rubber particles A) can be detected by transmission electron microscopic methods (e.g. by contrasting with osmium tetroxide, cf. e.g. J. A. Manson, L. H. Sperling: Polymer Blends and Composites (Plenum Press, New York/London, 1976), pp. 57–58 and literature cited there). Moreover the graft rubber particles A) in the electron microscope photographs (that is, in the image of the interface of cut) must contain irregular cell-shaped inclusions of the resin-forming polymer and show an irregular toothed structure at the particle surface. There must be present per particle 5 to 30, preferably 7 to 25 and particularly preferably 10 to 20 teeth, which are distinguished from an idealised round particle (with a particle diameter d) by a diameter d+d/x with x=3 to 15, preferably 4 to 12 and particularly preferably 5 to 10.

Diagrammatically:

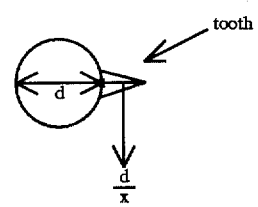

The manufacture of the graft rubber polymers B) takes place by emulsion polymerisation of resin-forming monomers in the presence of the rubber present in latex form. The graft rubber polymers B) possess preferably rubber contents of 30 to 80 wt %, particularly preferably 35 to 75 wt % and quite particularly preferably 40 to 70 wt %.

The manufacture of such products with graft rubber particles without pronounced inner structure with tooth-free surface is known and described in detail in the literature (cf. DE 24 20 357, DE 24 20 358, DE 35 23 312, DE 33 37 940); commercial ABS products based on emulsion polymers contain as a rule graft rubbers of this type as impact strength modifiers.

There are preferably used as rubbers for manufacturing the graft rubber polymer B) those with a glass transition temperature of below 0° C.

Suitable are e.g. the rubbers mentioned for the manufacture of A). Also preferred for manufacturing the graft rubber polymers B) are polybutadiene rubbers and SBR rubbers with up to 30 wt % of internally polymerised styrene, polybutadiene in particularly preferred.

The swelling indices of the rubber polymers to be used for manufacturing the graft rubber polymers B) are not critical, they can for example lie between approx. 10 and 80.

The graft polymerisation reaction for the manufacture of the graft rubbers B) takes place preferably by uniform exhaustive reaction of the monomers over the whole course of the reaction.

The size of the rubber particles to be used for manufacturing the graft rubber polymer B) can be varied within wide limits, e.g. in principle mean particle diameters of approx. 50 nm to approx. 500 nm are possible; preferable are rubber particles with mean diameters of approx. 70 nm to approx. 150 nm and of approx. 200 nm to approx. 480 nm, particularly preferably of approx. 80 nm to approx. 140 nm and of approx. 300 nm to approx. 450 nm. In this case mean particle diameters mean $d_{50}$ values which have been obtained by ultracentrifugal measurement (cf. W. Scholtan and H. Lange in Kolloid Z. und Z. Polymere 250, pp. 782 to 796 (1972).

Resin-forming monomers used in the manufacture of graft rubber polymer B) are preferably compounds with a vinyl group, e.g. styrene, $C_1$–$C_4$-alkyl-substituted styrenes, α-methylstyrene, acrylonitrile, methacrylonitrile, esters of acrylic acid and/or methacrylic acid with $C_1$–$C_8$-aliphatic or cycloaliphatic alcohols, N-substituted maleiimide or mixtures thereof. Particularly preferred are mixtures of styrene and acrylonitrile, preferably in the weight ratio 60:40 to 80-20, wherein styrene and/or acrylonitrile can in some cases be replaced by copolymerisable monomers, preferably by α-methylstyrene, methylmethacrylate or N-phenyl maleiimide.

In this case also molecular weight regulators can be used, preferably in amounts of 0.05 to 2 wt %, particularly preferably in amounts of 0.1 to 1 wt % (referred in each case to total monomer amount during the graft polymerisation reaction). Suitable molecular weight regulators are for example n-dodecyl mercaptan, t-dodecyl mercaptan, dimeric α-methylstyrene.

As initiators and emulsifiers and in the choice of the reaction temperature use can also be made in the manufacture of the graft rubber polymers B) of the same compounds and temperatures described in the manufacture of the graft rubber polymer A).

The graft rubber particles B) must not exhibit in the electron microscopic photographs (i.e. in the image of the interface of cut) a pronounced inner structure like graft rubber polymer A and must exhibit a round particle shape (in the ideal case, round particle shape optionally distorted slightly asymmetrically) with completely tooth-free surface.

The following are considered as optionally additionally useable thermoplastic rubber-free resin components C):

styrene/acrylonitrile copolymers, α-methylstyrene/ acrylo-nitrile copolymers, styrene/α-methylstyrene/ acrylonitrile terpolymers, styrene/methylmethacrylate copolymers, methylmethacrylate/acrylonitrile copolymers, polymethyl methacrylate, styrene/acrylonitrile/N-phenyl maleiimide terpolymers. Details of the manufacture of these resins are described for example in DE-AS 2 420 358 and DE-AS-2 724 360. Vinyl resins manufactured by bulk or solution polymerisation have proved particularly effective.

In addition to such thermoplastic resins composed of vinyl monomers, the use of e.g. aromatic polycarbonates, aromatic polyester carbonates, polyesters, polyamides as resin component C is also possible.

Suitable thermoplastic polycarbonates or polyester carbonates are known (cf. e.g. DE-AS 1 495 626, DE-OS 2 232 877, DE-OS 2 703 376, DE-OS 2 714 544, DE-OS 3 000 610, DE-OS 3 832 396, DE-OS 3 077 934), e.g. manufacturable by reaction of diphenols of formulas (I) and (II)

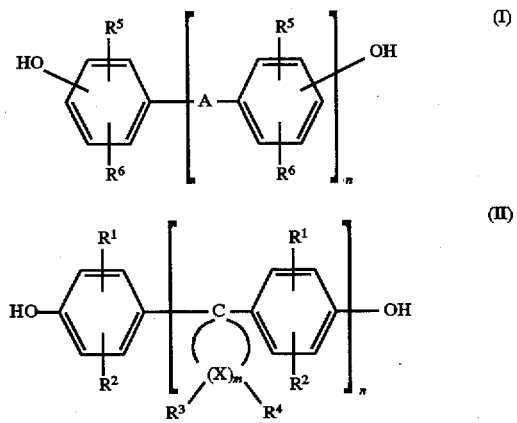

where

A is a single bond, $C_1$–$C_5$-alkylene, $C_2$–$C_5$-alkylidene, $C_5$–$C_6$-cyclo-alkylidene, —O—, —S—, —SO—, —$SO_2$— or —CO—, $R^5$ and $R^6$ stand independently of one another for hydrogen, methyl or halogen, in particular for hydrogen, methyl, chlorine or bromine, $R^1$ and $R^2$ signify independently of one another hydrogen, halogen, preferably chlorine or bromine, $C_1$–$C_8$-alkyl, preferably methyl, ethyl, $C_5$–$C_6$-cycloalkyl, preferably cyclohexyl, $C_6$–$C_{10}$-aryl, preferably phenyl, or $C_7$–$C_{12}$-aralkyl, preferably phenyl-$C_1$–$C_4$-alkyl, in particular benzyl, m is a whole number from 4 to 7, preferably 4 or 5, n is 0 or 1, $R^3$ and $R^4$ are individually selectable for each X and signify independently of one another hydrogen or $C_1$–$C_6$-alkyl and X signifies carbon, with carboxylic acid halides, preferably phosgene, and/or with aromatic dicarboxylic acid dihalides, preferably benzene dicarboxylic acid dihalides, according to the interface method or with phosgene according to the method in homogeneous phase (the so-called pyridine method), wherein the molecular weight can be adjusted in known manner by a corresponding quantity of known chain terminators.

Suitable diphenols of formulas (I) and (II) are e.g. hydroquinone, resorcinol, 4,4'-dihydroxydiphenyl,2,2-bis-(4-hydroxyphenyl)-propane,2,4-bis-(4-hydroxyphenyl)-2-methylbutane, 2,2-bis-(4-hydroxy-3,5-dimethylphenyl)-propane, 2,2-bis-(4-hydroxy-3,5-dichlorophenyl)-propane, 2,2-bis-(4-hydroxy-3,5-dibromophenyl)-propane, 1,1-bis-(4-hydroxyphenyl)-cyclohexane, 1,1-bis-(4-hydroxyphenyl) -3,3,5-trimethylcyclohexane, 1,1-bis-(4-hydroxyphenyl)-3, 3-dimethylcyclohexane, 1,1-bis-(4-hydroxyphenyl)-3,3,5,5-tetramethylcyclohexane or 1,1-bis-(4-hydroxyphenyl)-2,4, 4-trimethylcyclopentane.

Preferred diphenols of formula (I) are 2,2-bis-(4-hydroxyphenyl)opropane and 1,1-bis-(4-hydroxyphenyl)-cyclohexane, preferred phenol of formula (II) is 1,1-bis-(4-hydroxyphenyl)-3,3,5-trimethylcyclohexane.

Mixtures of diphenols can also be used.

Suitable chain terminators are e.g. phenol, p-tert.-butyl phenol, long-chain alkyl phenols such as 4-(1,3-tetramethylbutyl)phenol according to DE-OS 2 842 005, monoalkyl phenols, dialkyl phenols with altogether 8 to 20 C-atoms in the alkyl substituents according to DE-OS 3 506 472, such as p-nonyl phenol, 2,5-di-tert.-butyl phenol, p-tert.-octyl phenol, p-dodecyl phenol, 2-(3,5-dimethylheptyl)-phenol and 4-(3,5-dimethylheptyl)-phenol. The required amount of chain terminators is in general 0,5 to 10 mol. %, referred to the sum of the diphenols (I) and (II).

The suitable polycarbonates or polyester carbonates can be linear or branched; branched products are preferably obtained by the incorporation of 0.05 to 2.0 mol. %, referred to the sum of the diphenols used, of tri- or more than trifunctional compounds, e.g. those with three or more than three phenolic OH groups.

The suitable polycarbonates or polyester carbonates can contain aromatically bonded halogen, preferably bromine and/or chlorine: they are preferably halogen-free.

They have average molecular weights ($\overline{M}_w$, weight average), determined e.g. by ultracentrifugation or nephthelometry, of 10 000 to 200 000, preferably of 20 000 to 80 000.

Suitable thermoplastic polyesters are preferably polyalkylene terephthalates, that is reaction products of aromatic dicarboxylic acids or their reactive derivatives (e.g. dimethyl esters or anhydrides) and aliphatic, cycloaliphatic or arylaliphatic dioles and mixtures of such reaction products.

Preferred polyalkylene terephthalates can be manufactured from terephthalic acids (or their reactive derivatives) and aliphatic or cycloaliphatic dioles with 2 to 10 C-atoms according to known methods (Kunststoff-Handbuch, Vol. VIII, p. 695 ff, Carl Hanser Verlag, Munich 1973).

In preferred polyalkylene terephthalates are 80 to 100, preferably 90 to 100 mol. % of the dicarboxylic acid residues, terephthalic acid residues and 80 to 100, preferably 90 to 100 mol. % of the diol residues, ethylene glycol and/or 1,4-butanediol residues.

The preferred polyalkylene terephthalates can in addition to ethylene glycol or 1,4-butanediol residues contain 0 to 20 mol. % of residues of other aliphatic diols with 3 to 12 C-atoms or of cycloaliphatic diols with 6 to 12 C-atoms, e.g. residues of 1,3-propanediol, 2-ethyl-1,3-propanediol, neopentyl glycol, 1,5-pentanediol, 1,6-hexanediol, 1,4-cyclohexane-dimethanol, 3 -methyl- 1,3 - and - 1,6-pentanediol, 2-ethyl-1,3-hexanediol, 2,2-diethyl-1,3-propanediol, 2,5-hexanediol, 2,5-hexanediol, 1,4-di(β-hydroxyethoxy)-benzene, 2,2-bis-(4-hydroxycyclohexyl)-propane, 2,4-dihydroxy-1,1,3,3,-tetramethylcyclobutane, 2,2-bis-(3-β-hydroxyethoxyphenyl)-propane and 2,2-bis-(4-hydroxypropoxyphenyl)-propane (DE-OS 2 407 647, 2 407 776, 2 715 932).

The polyalkylene terephthalates can be branched by the incorporation of relatively small amounts of tri- or tetravalent alcohols or tri- or tetrabasic carboxylic acids, as are described in DE-OS 1 900 270 and U.S. Pat. No. 3,692,744. Examples of preferred branching agents are trimesinic acid, trimellitic acid, trimethylol ethane and propane and pentaerythritol. It is advisable to use not more than 1 mol. % of the branching agent, referred to the acid component.

Particularly preferred are polyalkylene terephthalates that have been manufactured solely from terephthalic acid and its reactive derivatives (e.g. its dialkyl esters) and ethylene glycol and/or 1,4-butanediol and mixtures of these polyalkylene terephthalates.

Preferred polyalkylene terephthalates are also copolymers that have been manufactured from at least two of the above-mentioned alcohol components: particularly preferred copolyesters are poly-(ethyleneglycol-1,4-butanediol)terephthalates.

The preferably suitable polyalkylene terephthalates possess in general an intrinsic viscosity of 0.4 to 1.5 dl/g, preferably 0.5 to 1.3 dl/g, in particular 0.6 to 1.2 dl/g, measured in each case in phenol/o-dichlorobenzene (1:1 parts by wt) at 25° C.

Suitable polyamides are known homopolyamides, copolyamides and mixtures of these polyamides. These can be partially crystalline and/or amorphous polyamides.

Suitable as partially crystalline polyamides are 6,-polyamide, 6,6,-polyamide and corresponding copolymers from these components. Partially crystalline polyamides are also considered whose acid component [consists] wholly or partly of terephthalic acid and/or isophthalic acid and/or suberic acid and/or sebacic acid and/or azelaic acid and/or adipic acid and/or cyclohexanedicarboxylic acid whose diamine component consists wholly or partly of m- and/or p-xylylene-diamine and/or hexamethylenediamime and/or 2,2,4-trimethylhexamethylenediamine and/or 2,2,4-trimethylhexamethylenediamine and/or isophoronediamine and whose composition is known in principle.

Polyamides can also be mentioned which are manufactured wholly or partly from lactams with 7–12 C-atoms in the ring, optionally with the use of one or more of the starting components mentioned above.

Particularly preferred partially crystalline polyamides are 6-polyamide and 6,6-polyamide and their mixtures. Known products can be used as amorphous polyamides. They are obtained by the polycondensation of aliamines such as ethylenediamine, hexamethylenediamine, decamethylenediamine, 2,2,4-and/or 2,4,4-trimethylhexamethylenediamine, m- and/or p-xylylenediamine, bis-(4-aminocyclohexyl)-methane, bis-(4-aminocyclohexyl)-propane, 3,3'-dimethyl-4,4'-diaminodicyclohexylmethane, 3-aminomethyl,3,5,5,-trimethylcyclohexylamine,2,5- and/or 2,6-bis-(aminomethyl)-norbornan and/or 1,4-diaminomethylcyclohexane with dicarboxylic acids such as oxalic acid, adipic acid, azelaic acid, decanedicarboxylic acid, heptadecanedicarboxylic acid, 2,2,4- and/or 2,4,4,-trimethyladipicacid, isophthalic acid and terephthalic acid.

Copolymers which are obtained by the polycondensation of several monomers are also suitable, and also copolymers which are manufactured with the addition of aminocarboxylic acids such as ε-aminocapronic acid, ω-aminoundecanoic acid or ω-aminolauric acid or their lactams.

Particularly suitable amorphous polyamides are the polyamides manufactured from isophthalic acid, hexamethylenediamine and further diamines such as 4,4'-diaminodicyclohexylmethane, isophoronediamine, 2,2,4- and/or 2,4,4,-trimethylhexamethylenediamine, 2,5- and/or 2,6-bis-(aminomethyl)-norbornen; or from isophthalic acid, 4,4'-diaminodicylcohexylmethane and ε-caprolactam; or from isophthalic acid, 3,3'-dimethyl-4,4'-diaminodicylcohexylmethane and laurinlactam; or from terephthalic acid and the isomeric mixture of 2,2,4- and/or 2,4,4-trimethylhexamethylenediamine.

Instead of the pure 4,4'-diaminodicyclohexylmethane use can also be made of the position isomeric diaminodicyclohexylmethanes, which are composed of 70 to 99 mol. % of the 4,4'-diamino isomer
1 to 30 mol. % of the 2,4'-diamino isomer
0 to 2 mol. % of the 2,2'-diamino isomer and
optionally correspondingly more highly condensed diamines which are obtained by the hydrogenation of diaminodiphenylmethane of technical quality. The isophthalic acid can be replaced up to 30% by terephthalic acid.

The polyamides preferably exhibit a relative viscosity (measured on a 1 wt % solution in m-cresol at 25° C.) of 2.0 to 5.0, particularly preferably of 2.5 to 4.0.

The blending of the individual components A, B and optionally C is possible in various ways.

Preferably the graft rubber components A) and B) are isolated individually or after the mixing at the latex stage by known methods, for example by spray drying or by addition of salts and/or acids, washing of the precipitation products and drying of the powder. After this the graft rubber powders A) and B) (with separate handling) or the powder mixture (with joint handling) are mixed optionally with the resin component C) (preferably on multiple roll mills, Millstruders or internal mixers).

If the resin component C) has been produced by emulsion polymerisation, this latex can be mixed and processed jointly with the latex of components A) and B).

There can be added to the moulding compositions according to the invention during manufacture, working up, further processing and final forming the necessary or appropriate additives, e.g. antioxidants, UV stabilizers, peroxide decomposers, antistatic agents, lubricants, demoulding agents, flame retardants, fillers or reinforcing materials (glass fibres, carbon fibres etc.), colouring agents.

The final forming can be performed on commercial processing units and covers e.g. injection moulding, sheet extrusion with optionally subsequent hot forming, cold forming, extrusion of pipes and profiles, calender processing.

In the following examples the parts given are always parts by weight and the % given always percentages by weight, unless stated otherwise.

Examples
Graft rubber A 40 parts by wt (calculated as solid) of an anionically emulsified polybutadiene latex manufactured by radical polymerisation with a $d_{50}$ value of 284 nm and a swelling index of 59 are brought with water to a solids content of approx. 20 wt % and then heated to 63° C. and mixed with 0.5 parts by wt of potassium peroxodisulphate (dissolved in water).

60 parts by wt of a mixture of 72 wt % of styrene and 28 wt % of acrylonitrile and 0. 1 parts by wt of tert.-dodecyl mercaptan are then added within 4 h so that in the course of the polymerisation reaction the following contents in unreacted monomer are obtained in the reaction mixture (determined by sampling, addition of phenothiazine, coagulation of the polymer portion and calculation of the unreacted monomer amount):

| Start of the sampling (min after start of reaction) | Portion of unreacted monomer in the reaction mixture (wt % referred to amount of monomer added) |
|---|---|
| 20 | 8.4 |
| 40 | 14.2 |
| 60 | 19.2 |
| 80 | 20.1 |
| 100 | 18.3 |
| 120 | 16.1 |
| 140 | 13.6 |
| 160 | 11.0 |
| 180 | 7.4 |
| 200 | 2.1 |
| 220 | 1.1 |
| 240 | 2.0 |
| 260 | 0.8 |
| 280 | 0.7 |
| 300 | 0.5 |

Parallel with the monomers there is added as emulsifier within 4 h 1 part by wt (calculated as solid substance) of the sodium salt of an oleoresin acid mixture (Dresinate 731, dissolved in alkaline adjusted water). After a 1-hour post-reaction time the graft polymer is coagulated after the addition of approx. 1.0 part by wt of a phenolic antioxidant with a mixture of aqueous magnesium sulphate solution and acetic acid; after washing with water the resulting powder is vacuum-dried at 70° C.

Graft rubber B1

50 parts by wt (calculated as solid) of an anionically emulsified polybutadiene latex manufactured by radical polymerisation with a $d_{50}$ value of 128 nm are brought with water to a solids content of approx. 20 wt % and then heated to 63° C. and mixed with 0.5 parts by wt of potassium peroxodisulphate (dissolved in water).

50 parts by wt of a mixture of 72 wt % of styrene and 28 wt % of acrylonitrile are then added within 6 h so that the monomers react uniformly during the course of the reaction. Parallel with the monomers there is added as emulsifier within 6 h 1 part by wt (calculated as solid substance) of the sodium salt of an oleoresin acid mixture (Dresinate 731, dissolved in alkaline adjusted water). The working up takes place as described under A.

Graft rubber B2

55 parts by wt (calculated as solid) of an anionically emulsified polybutadiene latex manufactured by radical polymerisation with a $d_{50}$ value of 412 nm are brought with water to a solids content of approx. 20 wt % and then heated to 62° C. and mixed with 0.5 parts by wt of potassium peroxodisulphate (dissolved in water).

45 parts by wt of a mixture of 72 wt % of styrene and 28 wt % of acrylonitrile are then added within 6 h so that the monomers react uniformly during the course of the reaction. The other conditions (emulsifier, working up) correspond to those in B1.

Thermoplastic resin C1

Styrene/acrylonitrile-copolymer resin (weight ratio styrene:acrylonitrile=72:28, $\overline{M}_w$ 85,000, $\overline{M}_w/\overline{M}_n-1 \leq 2$).

Thermoplastic resin C2

Styrene/acrylonitrile-copolymer resin (weight ratio styrene:acrylonitrile=72:28, $\overline{M}_w$=115 000, $\overline{M}_w/\overline{M}_n-1 \leq 2$).

Thermoplastic resin C3

α-methylstyrene/acrylonitrile-copolymer resin(weight ratio α-methylstyrene:acrylo-nitrile=72:28, $\overline{M}_w$=80 000, $\overline{M}_w/\overline{M}_n-1 \leq 2$).

ABS moulding compositions

The polymer components described above were mixed in the proportions given in Table 1 in an internal mixer, wherein in Examples 1 to 4 there were added as additives 2 parts by wt of pentaerythritol tetrastearate, 0.1 parts by wt of a silicon oil and 1 part by wt of a carbon black. In Examples 5 to 10 there were used as additives 1 part by wt of pentaerythritol tetrastearate, 0.5 parts by wt of magnesium stearate and a colouring agent (0.93 parts by wt of a blue colour mixture in Examples 5 to 7, 1 part by wt of a carbon black in Examples 8 to 10).

After granulation the moulding compositions were processed by injection moulding into test rods and into a special sheet with fins (for evaluating the deepening in colour).

The following data were also determined:

Notch impact strength at room temperature ($a_k^{RT}$) and at −40° C. ($a_k^{-40°\,C.}$) to ISO 180/1A (unit: kJ/m²), ball indentation hardness $H_c$ to DIN 53 456 (unit: N/mm²), heat resistance (Vicat B) to DIN 53 460 (unit: °C.), flow characteristics MVI to DIN 53 735 U (unit: cm³/10 min).

The evaluation of the deepening in colour took place visually according to the following scale:

1: very weak to not discernible
2: weak
3: moderate
4: strong
5: very strong

The results are given in Table 2. It is obvious from this that the moulding compositions according to the invention show very good mechanical values with only very weakly pronounced deepening in colour.

For illustration purposes, an electron microscope photograph was taken of a moulding composition according to the invention (Example 8) (contrasting with osmium tetroxide) (FIG. 1).

TABLE 1

Compositions of the tested moulding compositions

| Ex. | Graft rubber A parts by wt | Graft rubber B1 parts by wt | Graft rubber B2 parts by wt | Thermoplastic resin C1 parts by wt | Thermoplastic resin C2 parts by wt | Thermoplastic resin C3 parts by wt |
|---|---|---|---|---|---|---|
| 1 | 37.5 | — | 9.1 | — | 53.4 | — |
| 2 | 25 | — | 18.2 | — | 56.8 | — |
| 3 (comparison) | 50 | — | — | — | 50 | — |
| 4 (comparison) | — | — | 36.4 | — | 63.6 | — |

TABLE 1-continued

Compositions of the tested moulding compositions

| Ex. | Graft rubber A parts by wt | Graft rubber B1 parts by wt | Graft rubber B2 parts by wt | Thermoplastic resin C1 parts by wt | Thermoplastic resin C2 parts by wt | Thermoplastic resin C3 parts by wt |
|---|---|---|---|---|---|---|
| 5 | 27 | 4.5 | 4.5 | 34 | — | 30 |
| 6 (comparison) | — | 4.5 | 24.5 | 41 | — | 30 |
| 7 (comparison) | 39 | — | — | 31 | — | 30 |
| 8 | 27 | 4.5 | 4.5 | 34 | — | 30 |
| 9 (comparison) | — | 4.5 | 24.5 | 41 | — | 30 |
| 10 (comparison) | 39 | — | — | 31 | — | 30 |

TABLE 2

Test data of the tested moulding compositions

| Ex. | $a_k^{RT}$ (kJ/m$^2$) | $a_k^{-40°C.}$ (kJ/m$^2$) | $H_c$ (N/mm$^2$) | Vicat B (°C.) | MVI (cm$^3$/10 min) | Deepening in colour |
|---|---|---|---|---|---|---|
| 1 | 38 | 23 | 88 | 99 | 6 | 2 |
| 2 | 35 | 21 | 88 | 98 | 6 | 1 |
| 3 (comparison) | 40 | 24 | 86 | 99 | 6 | 5 |
| 4 (comparison) | 30 | 18 | 88 | 99 | 7 | 3 |
| 5 | 21 | 9 | 98 | 106 | 9 | 2 |
| 6 (comparison) | 17 | 7 | 100 | 107 | 9 | 3 |
| 7 (comparison) | 22 | 9 | 98 | 105 | 8 | 4 |
| 8 | 20 | 9 | 101 | 104 | 8 | 1 |
| 9 (comparison) | 17 | 7 | 99 | 105 | 9 | 3 |
| 10 (comparison) | 21 | 9 | 100 | 104 | 8 | 4 |

We claim:

1. Thermoplastic moulding compositions containing

A) 5 to 95 parts by wt of at least one particle-shaped ABS graft rubber polymer manufactured by emulsion polymerisation, in which the graft rubber particles have a structure in which the individual particles contain irregular cell-shaped inclusions of resin-forming polymer and the surface of the particles shows an irregular toothed structure, and for every particle 5 to 30 of such teeth are present, which are distinguished from an idealised round particle (with a diameter d) by a diameter d+d/x with x=3 to 15

B) 95 to 5 parts by wt of at least one particle-shaped ABS graft rubber polymer manufactured by emulsion polymerisation, in which the graft rubber particles have a structure in which the individual particles do not have a pronounced inner structure as in A) and possess a round particle shape with a tooth-free surface and optionally C) 0 to 300 parts by wt of at least one thermoplastic rubber-free resin.

2. The thermoplastic molding composition of claim 1, containing 10 to 80 parts of A), 90 to 20 parts of B), and 20 to 250 parts of C).

3. The thermoplastic molding composition of claim 1, wherein the rubbers A) and B) consists of polybutadiene and grafted-on styrene and acrylonitrile.

4. The thermoplastic molding composition of claim 1, wherein the rubbers A)and B) consist of polybutadiene and grafted-on styrene and acrylonitrile.

5. The thermoplastic molding composition of claim 1, wherein thermoplastic component C) is present and is selected from the group consisting of styrene/acrylonitrile-copolymer, α-methylstyrene/acrylonitrile-copolymer, aromatic polycarbonate, aromatic polyester carbonate, polyester, and polyamide.

6. A molding produced from the thermoplastic molding composition of claim 1.

* * * * *